(12) United States Patent
    Shibayama et al.

(10) Patent No.: US 12,597,988 B2
(45) Date of Patent:      Apr. 7, 2026

(54) RELAY DEVICE FOR RELAYING COMMUNICATION BETWEEN BASE STATION DEVICE AND TERMINAL DEVICE BY FORMING A BEAM, CONTROL METHOD, AND COMPUTER-READABLE STORAGE MEDIUM

(71) Applicant: KDDI CORPORATION, Tokyo (JP)

(72) Inventors: Masaya Shibayama, Tokyo (JP);
Masahito Umehara, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 310 days.

(21) Appl. No.: 18/429,792

(22) Filed: Feb. 1, 2024

(65) Prior Publication Data

US 2024/0171258 A1      May 23, 2024

Related U.S. Application Data

(63) Continuation of application No. PCT/JP2022/025726, filed on Jun. 28, 2022.

(30) Foreign Application Priority Data

Aug. 18, 2021      (JP) ................................. 2021-133661

(51) Int. Cl.
    *H04B 7/14*          (2006.01)
    *H04B 7/04*          (2017.01)
              (Continued)

(52) U.S. Cl.
    CPC ..... *H04B 7/15542* (2013.01); *H04B 7/04013* (2023.05)

(58) Field of Classification Search
    CPC .... H04B 7/0695; H04B 7/088; H04B 7/2606; H04B 7/026; H04B 7/15542;
              (Continued)

(56) References Cited

U.S. PATENT DOCUMENTS

2019/0372653 A1*  12/2019  Chae ..................... H04B 7/0617
2022/0264321 A1*   8/2022  Huang .................. H04W 72/23
              (Continued)

FOREIGN PATENT DOCUMENTS

WO    WO-2020/084672 A1    4/2020
WO    WO-2021/095181 A1    5/2021

OTHER PUBLICATIONS

Shimin Gong, et al., "Toward Smart Wireless Communications via Intelligent Reflecting Surfaces: A Contemporary Survey", IEEE Communications Surveys & Tutorials, vol. 22, No. 4, 2020 (31 pages).

*Primary Examiner* — Sai Aung
(74) *Attorney, Agent, or Firm* — Foley & Lardner LLP

(57)          ABSTRACT

A relay device relays a predetermined signal transmitted by a base station device through a predetermined beam by outputting the predetermined signal in a plurality of radio wave output directions without decoding user data, performs control such that the predetermined signal transmitted through the predetermined beam in a first time slot is relayed in a first direction among the plurality of radio wave output directions, and the predetermined signal transmitted through the predetermined beam in a second time slot is relayed in a second direction among the plurality of radio wave output directions, and selects an output direction, among the plurality of radio wave output directions, in which to output a radio wave in signal transmission between a terminal device and the relay device, based on a timing at which a second predetermined signal is received from the terminal device.

10 Claims, 3 Drawing Sheets

(51) Int. Cl.
    *H04B 7/155*         (2006.01)
    *H04B 7/26*         (2006.01)

(58) Field of Classification Search
    CPC ...... H04B 7/15507; H04B 7/14; H04B 17/40;
                    H04B 7/1555; H04B 7/15557
    See application file for complete search history.

(56)               References Cited

U.S. PATENT DOCUMENTS

| | | | | |
|---|---|---|---|---|
| 2022/0286946 A1* | 9/2022 | Abedini | ................ | H04W 48/20 |
| 2022/0311487 A1* | 9/2022 | Abedini | .............. | H04B 7/0617 |
| 2022/0346133 A1* | 10/2022 | Xue | ...................... | H04W 72/02 |
| 2022/0393756 A1* | 12/2022 | Matsumura | ........... | H04W 16/26 |
| 2026/0019116 A1* | 1/2026 | Takizawa | ............. | H04B 7/0617 |

* cited by examiner

F I G. 5

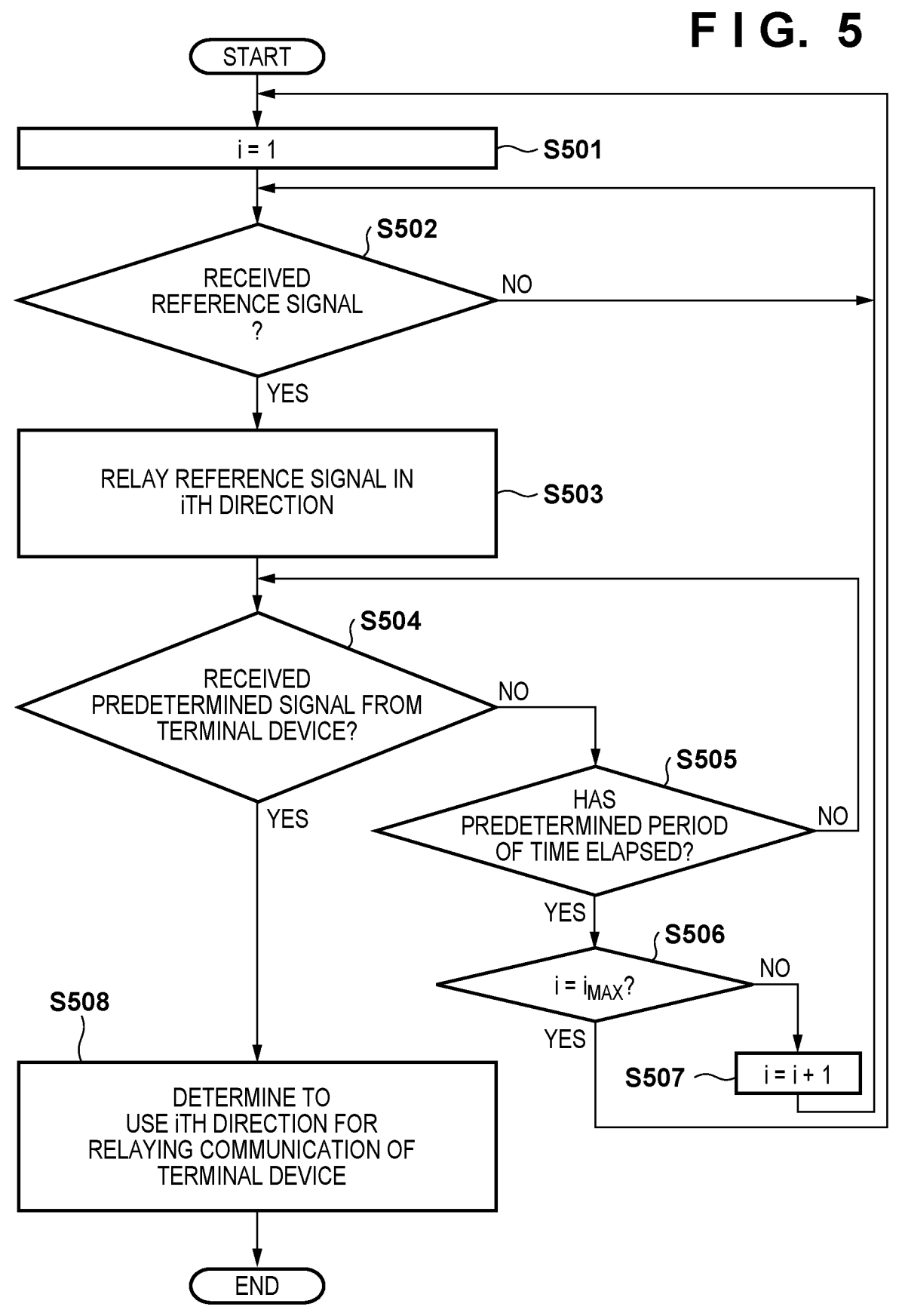

START i = 1 — S501

S502

RECEIVED REFERENCE SIGNAL ? — NO

YES

RELAY REFERENCE SIGNAL IN iTH DIRECTION — S503

S504

RECEIVED PREDETERMINED SIGNAL FROM TERMINAL DEVICE? — NO

YES

S505

HAS PREDETERMINED PERIOD OF TIME ELAPSED? — NO

YES

S506 i = i$_{MAX}$? — NO

YES

S507 — i = i + 1

S508

DETERMINE TO USE iTH DIRECTION FOR RELAYING COMMUNICATION OF TERMINAL DEVICE

END

1

RELAY DEVICE FOR RELAYING COMMUNICATION BETWEEN BASE STATION DEVICE AND TERMINAL DEVICE BY FORMING A BEAM, CONTROL METHOD, AND COMPUTER-READABLE STORAGE MEDIUM

CROSS-REFERENCE TO RELATED APPLICATION

This application is a continuation of International Patent Application No. PCT/JP2022/025726 filed on Jun. 28, 2022, which claims priority to and the benefit of Japanese Patent Application No. 2021-133661, filed Aug. 18, 2021, the entire disclosures of which are incorporated herein by reference.

BACKGROUND OF THE INVENTION

Field of the Invention

The present invention relates to relay transmission techniques for relaying wireless signals without decoding user data.

Description of the Related Art

In mobile communication, wireless repeaters are used to expand areas where communication is possible. A wireless repeater can ensure that a signal transmitted by a base station device reaches areas where radio waves normally have difficulty reaching, such as remote areas and behind buildings, by receiving, amplifying (and converting the frequency, if necessary), and then sending the signal. A reflector can be used instead of a wireless repeater for areas such as behind buildings.

A base station device can generally be configured to form a plurality of beams to provide sufficiently high-speed communication services to terminal devices in the area. In such a case, the wireless repeater receives and transmits signals sent through any one of the plurality of beams formed by the base station device. However, if the wireless repeater relays the signal using an omnidirectional antenna, the gain may be insufficient due to the relay, resulting in an insufficient area expansion effect. It is therefore conceivable for the wireless repeater to relay signals by forming a plurality of beams directed in different directions. Also, when using a reflector, it is important to appropriately set the direction in which the signal is reflected. While changing the physical orientation of a reflector makes it possible to change the direction in which signals are reflected, using a metamaterial reflector makes it possible to reflect radio waves in various directions without changing the physical orientation (see Shimin Gong, et al., "Toward Smart Wireless Communications via Intelligent Reflecting Surfaces: A Contemporary Survey", IEEE COMMUNICATIONS SURVEYS & TUTORIALS, Vol. 22, No. 4, 2020; referred to as "Non-Patent Document 1" hereinafter).

As described above, when a wireless repeater or reflector is capable of sending radio waves in a plurality of directions, it is important for a relay device which does not decode user data, such as a wireless repeater or a reflector, to specify and use beams suitable for relaying terminal device communications.

SUMMARY OF THE INVENTION

The present invention provides a technique for specifying a beam to be used for communicating with a terminal apparatus by a relay apparatus which is capable of outputting signals in a plurality of directions and which does not decode user data.

According to one aspect of the present invention, there is provided a relay device that relays communication between a base station device and a terminal device, the relay device comprising: one or more processors; and one or more memories that store a computer-readable instruction for causing, when executed by the one or more processors, the one or more processors to function as: a relay unit configured to relay a predetermined signal transmitted by the base station device through a predetermined beam by outputting the predetermined signal in a plurality of radio wave output directions without decoding user data; a control unit configured to control the relay unit such that the predetermined signal transmitted through the predetermined beam in a first time slot is relayed in a first direction among the plurality of radio wave output directions, and the predetermined signal transmitted through the predetermined beam in a second time slot is relayed in a second direction among the plurality of radio wave output directions; and a selection unit configured to select an output direction, among the plurality of radio wave output directions, in which to output a radio wave in signal transmission between the terminal device and the relay device, based on a timing at which a second predetermined signal is received from the terminal device.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 5 illustrates an example of the flow of processing executed by the relay device.

DESCRIPTION OF THE EMBODIMENTS

Figure 1:
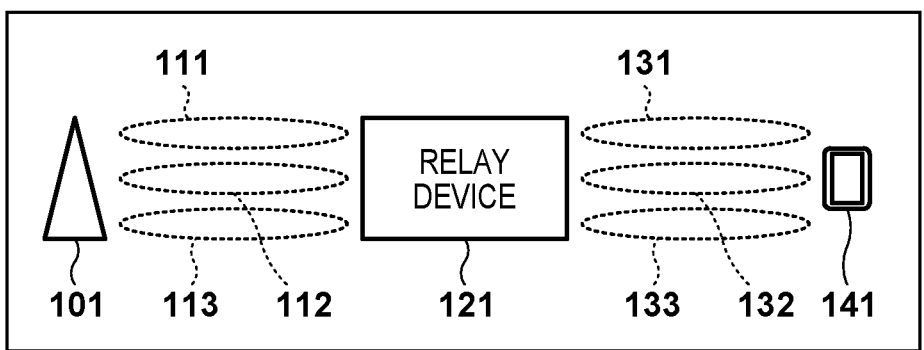
FIG. 1 is a diagram illustrating an example of the configuration of a wireless communication system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Configuration of Communication System

FIG. 1 illustrates an example of the configuration of a wireless communication system according to the present embodiment. This wireless communication system is a relay communication system in which a relay device 121 relays communication between a base station device 101 and a terminal device 141. In this wireless communication system, the base station device 101 transmits signals by forming a plurality of beams 111 to 113, and the relay device 121 relays signals received through one of the beams to the terminal device 141. The relay device 121 can set a plurality of radio wave output directions 131 to 133, and can output the received signal in at least one of the plurality of radio wave output directions 131 to 133. Note that in one example, the relay device 121 is a wireless repeater and is configured to amplify and output the received signal. In this case, the relay device 121 can be configured to use a plurality of antennas to form the plurality of beams directed in the plurality of radio wave output directions 131 to 133, and relay communication using those beams, for example. In another example, the relay device 121 can be a reflector. The relay device 121 can be configured to physically change its orientation to reflect and output radio waves in each of the plurality of radio wave output directions 131 to 133, for example. The relay device 121 may also be a metamaterial reflector. A metamaterial reflector is a reflector in which a large number of passive elements are arranged in an array, and the phases of those passive elements can be simultaneously controlled to reflect incident radio waves in any desired direction without needing to control the physical attitude of the reflector, for example. Details can be found in Non-Patent Document 1, cited earlier, and will therefore not be given here. If the relay device 121 is a reflector, the incoming signals are not amplified.

The relay device 121 only transfers signals between the base station device 101 and the terminal device 141, without decoding user data, and thus the base station device 101 and the terminal device 141 perform the same communication processing as they would if they were connected to each other directly.

If the relay device 121 is not present, the terminal device 141 measures predetermined signals such as reference signals transmitted through each of the plurality of beams formed by the base station device 101, and selects a beam based on the radio quality, for example. Then, by transmitting a random access preamble using the frequency/time resources corresponding to that beam, the terminal device 141 can connect to the base station device 101 through that beam. After connecting to the base station device 101, the terminal device 141 can transmit identification information of, for example, the beam having the strongest reception power to the base station device 101, at any desired timing.

Here, if the relay device 121 is present, the relay device 121 relays communication related to one of the beams formed by the base station device 101. Therefore, in one example, the terminal device 141 receives a predetermined signal through only one of the beams relayed by the relay device 121, and attempts to make a connection through that beam. Even if the relay device 121 is capable of outputting signals from the base station device 101 in a plurality of directions, however, the relay device 121 can only output the signals sent from the base station device 101, and cannot transmit reference signals and the like corresponding to each of the plurality of directions, for example. For this reason, the frequency/time resources used by the terminal device 141 to transmit the random access preamble are also those corresponding to the beam relayed by the relay device 121, and which of the radio wave output directions 131 to 133 should be used to transmit signals between the relay device 121 and the terminal device 141 cannot be specified.

In view of these circumstances, the present embodiment provides a technique that enables the relay device 121 to specify a radio wave output direction (beam or reflection direction) for transmitting signals between the relay device 121 and the terminal device 141. The relay device 121 is configured to output and relay predetermined signals such as reference signals, which are repeatedly transmitted by the base station device 101 through a predetermined beam, in each of a plurality of radio wave output directions. At this time, the relay device 121 assigns individual relay opportunities for the predetermined signal to each of the plurality of radio wave output directions. In other words, the predetermined signal transmitted in a first time slot is output in a first radio wave output direction, and the predetermined signal transmitted in the second time slot different from the first time slot is output in a second radio wave output direction different from the first radio wave output direction.

Figure 2:
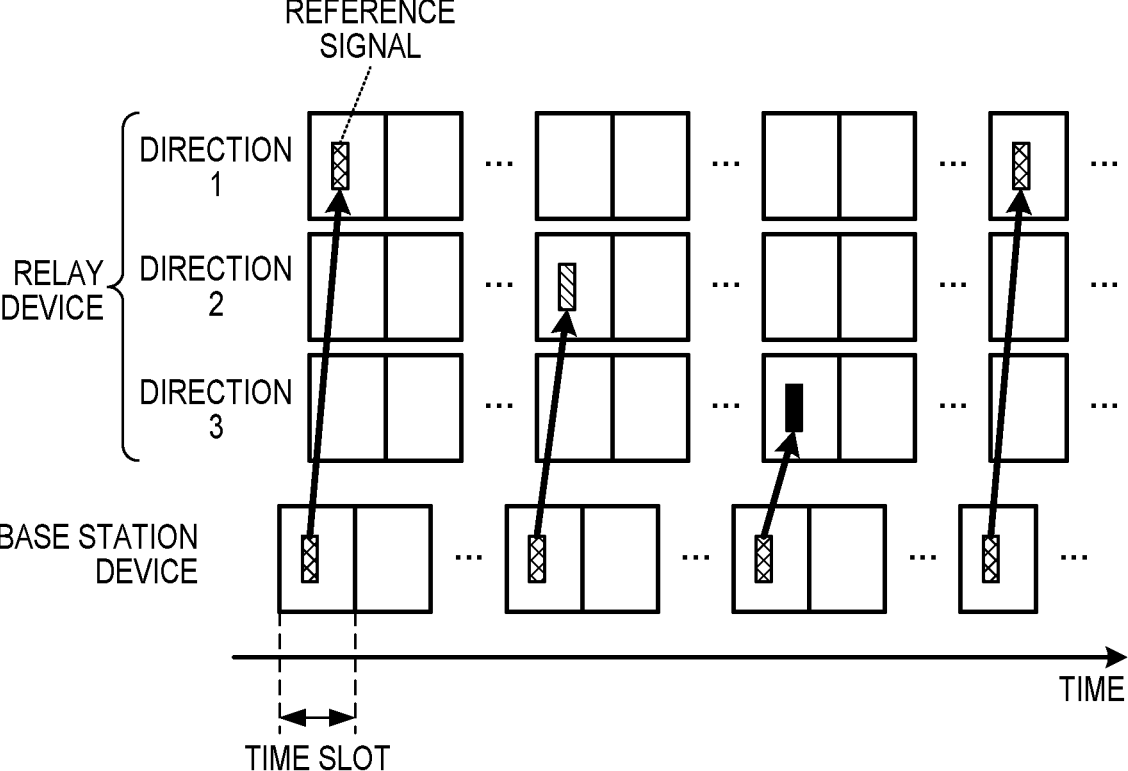
FIG. 2 is a diagram illustrating a reference signal relay method.

FIG. 2 schematically illustrates how the predetermined signal (the reference signal) transmitted from the base station device 101 is relayed by the relay device 121. As illustrated in FIG. 2, the base station device 101 transmits the reference signal at constant time intervals. Note that when forming a plurality of beams, the base station device 101 sends the reference signals in each of the plurality of beams. The relay device 121 performs the following processing on the reference signal having the strongest reception power, for example. When the base station device 101 sends reference signals in each of a plurality of beams, the relay device 121 selects a beam, among that plurality of beams, that has good radio quality with respect to a predetermined standard (e.g., the radio quality is the highest, or satisfies a standard such as exceeding a predetermined quality threshold), and amplifies and sends, or reflects, the reference signal sent through that beam, through the following processing. The relay device 121 relays the reference signals arriving from the base station device 101 at different timings in each of the plurality of radio wave output directions in which the relay device 121 itself can output (radiate or reflect) radio waves. FIG. 2 illustrates an example in which the relay device 121 relays the reference signal received the first time in a first direction, relays the reference signal received the second time in a second direction, and relays the reference signal received the third time in a third direction. In this manner, the relay device 121 relays the reference signal according to the timing at which the reference signal is received, but only in one direction for each relay opportunity. This is merely an example, however, and reference signals grouped for a plurality of directions (but for only some of the radio wave output directions which can be set) may be relayed in the same relay opportunity, for example.

Then, when a connection with the base station device 101 is to be established, the terminal device of the present embodiment transmits a random access preamble within a predetermined period of time after receiving a reference signal at a power stronger than a predetermined power, for example. The frequency/time resources with which the random access preamble is transmitted are the frequency/time resources for random access preamble transmission which have been set for the beam formed by the base station device 101 and for which the communication is relayed by the relay device 121. Similarly, the terminal device transmits information indicating identification information of the beam from the transmission source of the reference signal received at the strongest power, such as during the connection with the base station device 101, within a predetermined period after receiving the reference signal at the strongest power, for example. Here, the beam identification information for the transmission source of the reference signal is identification information of the beam, formed by the base station device 101, which is to be relayed by the relay device 121. In other words, the relay device 121 only relays the signals transmitted by the base station device 101, and no beam identification information is attached to the plurality of beams formed by the relay device 121.

Figure 3:
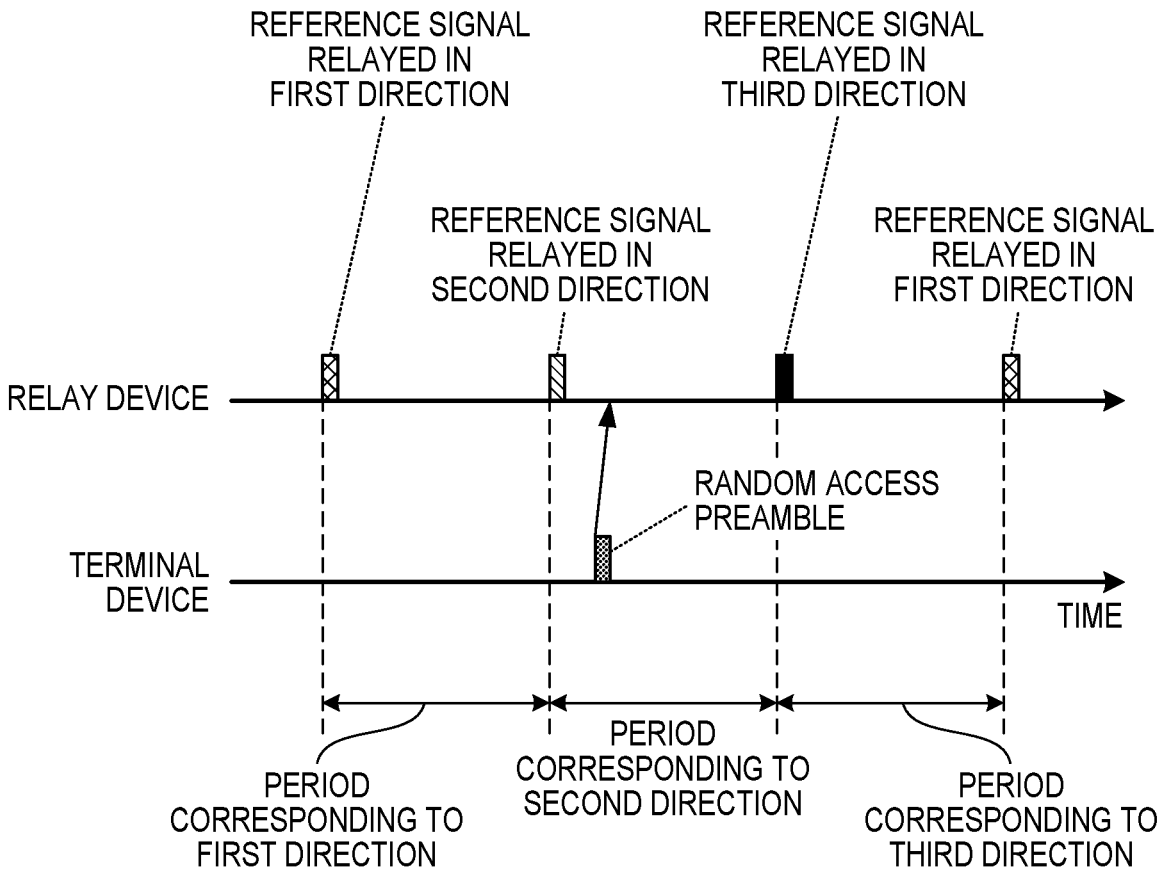
FIG. 3 is a diagram illustrating processing for determining a radio wave output direction used in relay.

For example, as illustrated in FIG. 3, the period of time from when the relay device 121 outputs a reference signal in a first direction until immediately before outputting a reference signal in the second direction is associated with the first direction. Likewise, the period of time from when the relay device 121 outputs a reference signal in the second direction until immediately before outputting a reference signal in a third direction is associated with the second direction, and the period of time from when the relay device 121 outputs a reference signal in the third direction until immediately before outputting a reference signal in the first direction is associated with the third direction. In this manner, different periods of time correspond to different ones of the plurality of radio wave output directions, and the relay device 121 can identify the radio wave output direction to be used in communication with the relay device 121 based on the period of time that includes the timing at which the terminal device 141 transmitted the signal. In the example in FIG. 3, the terminal device 141 is transmitting the random access preamble in the period corresponding to the second direction, the relay device 121 can therefore determine to use a second radio wave output direction for communication between that terminal device 141 and the base station device 101. Note that relationships between the radio wave output directions and the periods may be configured differently from the example in FIG. 3.

The processing described above can be performed separately for a plurality of terminal devices. In other words, when relaying communication between the base station device 101 and a plurality of terminal devices, the relay device 121 may determine the radio wave output direction to be used for each terminal device. The relay device 121 can also have a function for identifying the terminal device for which such processing is to be performed. For example, the relay device 121 can demodulate physical layer information from the signal sent from the terminal device (without decoding the user data, however) to obtain information that can identify the terminal device, such as a radio network temporary identifier (RNTI) or the like. The relay device 121 can then execute the processing described above for each terminal device based on the identified information, and determine the radio wave output direction to be used.

As described above, when a plurality of directions for outputting radio waves can be set in the relay device 121, communication with that terminal device can be relayed in a direction suited to the terminal device. Although the present embodiment mainly describes a case where the relay device 121 relays signals from the base station device 101 to the terminal device 141, the relay device 121 can of course relay signals transmitted by the terminal device 141 to the base station device 101.

Device Configuration

Figure 4:
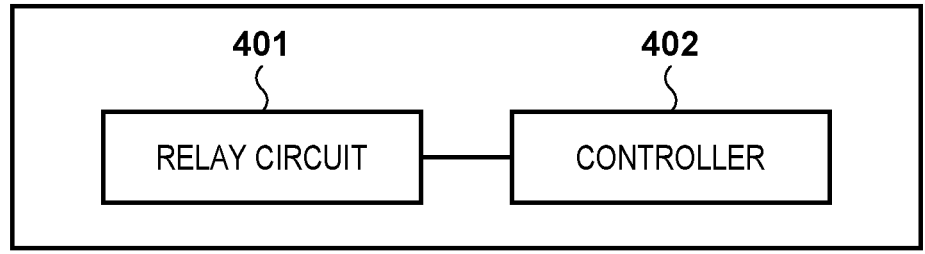
FIG. 4 illustrates an example of the configuration of a relay device.

The configuration of the relay device 121 that performs the processing described above will be described next with reference to FIG. 4. The relay device 121 includes a relay circuit 401 and a controller 402, for example.

The relay circuit 401 is configured including an amplifier and a frequency converter for non-regenerative relay, for example. In this case, the relay circuit 401 includes a plurality of antennas and has a function for multiplying a signal output from each antenna by an antenna weight and outputting that signal for each of the plurality of radio wave output directions that can be set, for example. The relay circuit 401 may be a reflector, for example, and has a function for setting the reflection direction of radio waves by the reflector to one of a plurality of radio wave output directions. For example, the relay circuit 401 can have a function for physically changing the orientation of the reflector such that radio waves are reflected in each of the plurality of radio wave output directions that can be set. The relay circuit 401 may also be a metamaterial reflector having a fixed reflector orientation. In this case, the relay circuit 401 has a function for reflecting radio waves in each of the plurality of radio wave output directions that can be set by controlling the phases of the large number of passive elements in the reflector, for example.

The controller 402 determines the radio wave output direction used for signal transmission between the base station device 101 and the terminal device 141, and executes control for storing information pertaining to that direction, when relaying a predetermined signal such as the reference signal as described above, and when relaying other signals from the base station device 101 or the terminal device 141, for example. The controller 402 can demodulate an arriving signal at the physical layer and obtain information identifying the terminal device, for example. Then, when the radio wave output direction is determined as described above, the controller 402 can then store the information identifying the terminal device in association with information that can specify the radio wave output direction. The relay circuit 401 can then be controlled to relay signals in the radio wave output direction associated with the terminal device when communicating with that terminal device. The controller 402 is, for example, a computer including one or more processors and one or more memories, and the processors execute a program stored in the memories to execute the processing.

Note that the relay device 121 can be configured to receive a power supply from an external commercial power source (not shown), for example, and the relay circuit 401 and controller 402 can be operated using that power. As such, the power of the relayed signal will not drop even if processing such demodulating the physical layer of the received signal is performed in the reflector.

Flow of Processing

Next, an example of the flow of the processing for determining the direction to be used in the relay executed by the relay device 121 will be described with reference to FIG. 5. This processing can be started in response to the supply of power to the relay device 121 being started, for example. First, the relay device 121 makes initial settings such as resetting the radio wave output direction for the processing (i=1) (step S501), and then waits for a predetermined signal such as a reference signal to arrive from the base station device 101 (step S502). The relay device 121 can specify the beam corresponding to the reference signal having the strongest reception power as the beam for relay, for example, based on the predetermined signals such as reference signals transmitted in the plurality of beams formed by the base station device 101. Note that the relay device 121 outputs the received signal simply by amplifying or reflecting the signal, and can therefore also relay signals sent through beams aside from the specified beam. However, in step S502, the relay device 121 waits for the reference signal of the specified beam.

Upon receiving the predetermined signal such as a reference signal (e.g., transmitted in the beam specified for relay) (YES in step S502), the relay device 121 relays the predetermined signal in an i-th radio wave output direction (step S503). Then, the relay device 121 determines whether a second predetermined signal, such as a random access preamble or a signal indicating identification information of the beam having the strongest reception power, has been received from the terminal device (step S504) within a predetermined period corresponding to the i-th radio wave output direction (NO in step S505). If the second predetermined signal has not been received within the predetermined period (NO in step S504; YES in step S505), the relay device 121 determines whether the predetermined signal such as a reference signal has been relayed in all the directions which can be set (step S506). If the predetermined signal has been relayed in all the directions which can be set (YES in step S506), the relay device 121 returns the sequence to step S501, whereas if there is a direction in which the predetermined signal has not yet been relayed (NO in step S506), the relay device 121 changes the relay direction of the predetermined signal (step S507) and returns the sequence to step S502. On the other hand, if the second predetermined signal has been received within the predetermined period (YES in step S504), the relay device 121 determines the direction in which the predetermined signal such as a reference signal was output in step S503 as the direction to be used when relaying the communication of the terminal device 141 (YES in step S508), and then ends the sequence.

In this manner, the relay device 121 can determine the radio wave output direction suitable for relaying the communication of the terminal device. The relay device 121 then relays the communication between the base station device 101 and the terminal device 141 according to the determined direction. Note that the relay device 121 can repeat the processing illustrated in FIG. 5 every predetermined period of time, for example. This makes it possible to relay communication using the appropriate radio wave output direction even when the situation changes, such as when the terminal device 141 moves.

Although the radio wave output direction is the direction from the relay device 121 to the terminal device 141, but the radio wave output direction can also be used to accept the input of radio waves from the terminal device 141 and relay signals toward the base station device 101. In other words, the radio wave output direction described above can be interpreted as being a radio wave input and output direction. Furthermore, the predetermined signal transmitted by the base station device 101 is not limited to a reference signal, and may be another signal, such as a synchronization signal, for example.

According to the present invention, it is possible to specify a beam to be used for communicating with a terminal apparatus by a relay apparatus which is capable of outputting signals in a plurality of directions and which does not decode user data.

The invention is not limited to the foregoing embodiments, and various variations/changes are possible within the spirit of the invention.

What is claimed is:

1. A relay device that relays communication between a base station device and a terminal device, the relay device comprising:

one or more processors; and one or more memories that store a computer-readable instruction for causing, when executed by the one or more processors, the one or more processors to function as:

a relay unit configured to relay a predetermined signal transmitted by the base station device through a predetermined beam by outputting the predetermined signal in a plurality of radio wave output directions without decoding user data;

a control unit configured to control the relay unit such that the predetermined signal transmitted through the predetermined beam in a first time slot is relayed in a first direction among the plurality of radio wave output directions, and the predetermined signal transmitted through the predetermined beam in a second time slot is relayed in a second direction among the plurality of radio wave output directions; and a selection unit configured to select an output direction, among the plurality of radio wave output directions, in which to output a radio wave in signal transmission between the terminal device and the relay device, based on a timing at which a second predetermined signal is received from the terminal device.

2. The relay device according to claim 1, wherein the relay device is a wireless repeater, and the relay unit relays a signal from the base station device by amplifying the signal and sending the signal in at least one of the plurality of radio wave output directions.

3. The relay device according to claim 1, wherein the relay device is a reflector, and the relay unit relays a signal from the base station device by reflecting the signal in at least one of the plurality of radio wave output directions.

4. The relay device according to claim 3, wherein the reflector is a metamaterial reflector.

5. The relay device according to claim 1, wherein each of the plurality of radio wave output directions is associated with a different period, and the selection unit selects the output direction, among the plurality of radio wave output directions, in which to output the radio wave in the signal transmission between the terminal device and the relay device based on a relationship between the timing at which the second predetermined signal is received from the terminal device and the period.

6. The relay device according to claim 5, wherein the one or more processors further function as:

an identification unit configured to identify the terminal device, wherein the selection unit selects the output direction for each terminal device.

7. The relay device according to claim 1, wherein the second predetermined signal is a random access preamble transmitted using frequency/time resources corresponding to the predetermined beam.

8. The relay device according to claim 1, wherein the second predetermined signal is a signal including identification information identifying the predetermined beam.

9. A control method executed by a relay device that relays communication between a base station device and a terminal device, the control method comprising:

relaying a predetermined signal transmitted by the base station device through a predetermined beam by outputting the predetermined signal in a plurality of radio wave output directions without decoding user data; and selecting an output direction, among the plurality of radio wave output directions, in which to output a radio wave in signal transmission between the terminal device and the relay device, based on a timing at which a second predetermined signal is received from the terminal device, wherein in the relaying of the predetermined signal, the predetermined signal transmitted through the predetermined beam in a first time slot is relayed in a first direction among the plurality of radio wave output directions, and the predetermined signal transmitted through the predetermined beam in a second time slot is relayed in a second direction among the plurality of radio wave output directions.

10. A non-transitory computer-readable storage medium storing a program that causes a computer, which is included in a relay device that relays communication between a base station device and a terminal device, to:

relay a predetermined signal transmitted by the base station device through a predetermined beam by outputting the predetermined signal in a plurality of radio wave output directions without decoding user data; and select an output direction, among the plurality of radio wave output directions, in which to output a radio wave in signal transmission between the terminal device and the relay device, based on a timing at which a second predetermined signal is received from the terminal device, wherein in the relay, the predetermined signal transmitted through the predetermined beam in a first time slot is relayed in a first direction among the plurality of radio wave output directions, and the predetermined signal transmitted through the predetermined beam in a second time slot is relayed in a second direction among the plurality of radio wave output directions.

\* \* \* \* \*